(12) United States Patent
Heffner (10) Patent No.: US 6,459,488 B1
(45) Date of Patent: Oct. 1, 2002

(54) DIFFUSE REFLECTANCE METHOD AND APPARATUS FOR DETERMINING THICKNESS OF AN INFRARED TRANSLUCENT LAYER

(75) Inventor: Kenneth H. Heffner, Largo, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/502,059

(22) Filed: Feb. 10, 2000

(51) Int. Cl.⁷ .................................................. G01B 9/02
(52) U.S. Cl. ....................................................... 356/504
(58) Field of Search ................................. 356/504, 632; 250/339.06, 559.28

(56) References Cited

U.S. PATENT DOCUMENTS

| | | |
|---|---|---|
| 5,039,222 A | 8/1991 | Izumi |
| 5,208,766 A | 5/1993 | Changetal |
| 5,227,861 A * | 7/1993 | Nishizawa et al. ......... 356/497 |
| 5,349,438 A | 9/1994 | Solomon |
| 5,422,831 A | 6/1995 | Misraetal |

OTHER PUBLICATIONS

Peter R. Griffiths and James A. deHaseth "Fourier Transform Infrared Spectroscopy", pp. 186–202, 1986, John Wiley & Sons, NY.

K. Krishnan "Characterization of Semiconductor Silicon Using the FT–IR Microsampling Techniques", FTS/IR Notes No. 66 Oct. 1988, Bio–Rad, Digital Division, 237 Putnman Avenue, Cambridge, Massachusetts.

* cited by examiner

Primary Examiner—Samuel A. Turner
Assistant Examiner—Patrick Connolly
(74) Attorney, Agent, or Firm—John Tarlano (57) ABSTRACT

A method for producing an interferogram of an infrared translucent layer that is on a reflective substrate, comprising generating parallel infrared interferometer beams by means of an infrared interferometer, converging the parallel infrared interferometer beams into converging infrared interferometer beams, sending the converging infrared interferometer beams onto the infrared translucent layer to produce diffusely reflected infrared interferometer rays from above and below the infrared translucent layer, and making the diffusely reflected infrared interferometer rays into parallel reflected infrared interferometer rays.

6 Claims, 8 Drawing Sheets

DELTA t - DIFFERENCE FROM REFERENCE THICKNESS

DIFFUSE REFLECTANCE METHOD AND APPARATUS FOR DETERMINING THICKNESS OF AN INFRARED TRANSLUCENT LAYER

FIELD OF THE INVENTION

A diffuse reflectance method and apparatus are used to determine thickness of an infrared translucent layer on a metal substrate.

BACKGROUND OF THE INVENTION

In a past, collimated beams, coming from an interferometer, were used to produce an interferogram of a relatively thick silicon layer that had been epitaxially coated onto a silicon wafer. A single angle of incidence was made with the silicon layer, by collimated interferometer beams. Reflections of the collimated beams were produced. Again, collimated interferometer beams were used in the past to form an interferogram. The interferogram was used to determine the thickness of the relatively thick silicon layer.

The present diffuse reflectance method and apparatus provide for an accurate measurement of thickness of a relatively thin infrared translucent layer on a metal substrate. An example of such a relatively thin translucent layer on a metal substrate is a thin beryllium oxide region that is formed into a beryllium metal part.

The present method uses diffuse reflectance to measure thickness of the relatively thin beryllium oxide region. Parallel infrared interferometer beams are emitted from an interferometer. A concave mirror is used to converge the parallel beams into converging infrared interferometer beams. Converging interferometer beams are sent onto both the beryllium oxide region and underlying beryllium substrate. Diverging infrared interferometer rays are diffusely reflected from the beryllium oxide region and beryllium substrate, after reflection of the converging infrared interferometer beams from the beryllium oxide region and from the beryllium substrate.

The diverging interferometer rays are collimated and analyzed by means of Fourier transform infrared spectroscopy.

A concave mirror is used in the present apparatus to collimate, that is make parallel, the diverging interferometer beams.

Different angles of incidence are made between the converging interferometer beams and a line perpendicular to the surface of the beryllium oxide region.

A movable mirror of the inteferometer is scanned and the overall intensity of interfereing diffusely reflected rays, coming from the beryllium oxide region and beryllium substrate, is detected. An inteferogram is produced by recording the intensity versus the increment amount of scan distance. Sidebursts occur in the interferogram due to reflections above and below the oxide region. An amount of displacement of a first sideburst, in the interferogram, from a centerburst, in the interferogram, is measured. The amount of displacement is indicative of the thickness of the beryllium oxide region.

The present diffuse reflection method and apparatus were used to measure the thickness of a beryllium oxide region that had been formed in a beryllium substrate. Beryllium oxide thicknesses ranging from 0.67 microns to 4 microns were measured.

A beryllium oxide region is formed in a beryllium substrate by oxiding the beryllium substrate. The beryllium oxide region could be a beryllium oxide region that was formed by oxidizing a beryllium part.

It is noted that when a beryllium substrate is oxidized, there is a less uniform interface region than the interface region that occurs when a silicon layer is epitaxially placed on a silicon wafer.

A prior art software program, that had been used in the prior art measurement of a thickness of a relatively thick epitaxial silicon layer coated onto a silicon wafer, was modified. The software was used to measure thicknesses of the silicon layers that had thicknesses that ranged from 25 microns to 150 microns. The prior art software program operated by subtracting an interferogram of the epitaxial layer under examination from an interferogram of a reference epitaxial layer of known thickness. The resultant subtracted interferogram was searched by the software until a first major sideburst was found. At this point, the program calculates the thickness of the silicon epitaxial layer, using the distance of the sideburst from a centerburst of the subtracted interferometer, and the refractive index of the silicon epitaxial material.

Again, the prior art software program operated by subtracting an interferogram of the silicon layer under examination from an interferogram of a reference silicon layer of known thickness. The resultant subtracted interferogram was searched by the software until a first major sideburst was found. At this point, the program calculates the thickness of the silicon layer, using the distance of the sideburst from a centerburst of the subtracted interferometer, and the refractive index of the epitaxial silicon.

The prior art software program was modified in order to be used with the new method and apparatus. The modified software program can be used to measure the thickness of a relatively thin beryllium oxide region in a beryllium substrate. Such an oxide region might have a thickness from between 0.67 microns to 4 microns. A refractive index value of 1.8 was selected for a beryllium oxide region, in the modified software program. This value is used with the modified software program.

As part of its broad scope, a producibility program supported applications of new advancements from a wide range of technical disciplines to improvements of manufacturing and testing techniques for instruments. In this regard, steps were taken to prove that a nondestructive thickness measurement of beryllium oxide regions, in anodized beryllium components, was possible using diffuse reflectance Fourier transform infrared spectroscopy. Further steps were taken to demonstrate that the method could be readied for production use. By first demonstrating the interferometric principle with spectral patterns obtained from anodization regions of varying thicknesses, the modified prior art software program was incorporated into the disclosed method.

The modified software program enabled automated, nondestructive beryllium oxide region measurement by operators on a production line. The software program operated to the satisfaction of production and design engineers.

The disclosed diffuse reflection Fourier transform infrared spectroscopic method and apparatus, for measuring thicknesses of beryllium oxide regions, developed under the producibility program, can provide useful processing information about anodization region thickness and region uniformity, and to determine changes in the region's chemical composition. An implementation plan was developed by production engineers to determine how the disclosed method and apparatus, and the information that it generates, could be used.

When a group of beryllium components are manufactured, several production samples are routinely destroyed by an acid-etch technique wherein one obtains the thickness of the anodization, that is oxide, region, by etching away a small area of the oxide region and measuring the resultant hole with a form tally instrument. Aside from the destruction of useful hardware, there is some question regarding the accuracy of the acid-etch techniques. This issue warranted the use of an alternate thickness measurement method.

The disclosed diffuse reflectance method and apparatus will preserve hardware and improve the accuracy and efficiency for determining oxide region thicknesses.

SUMMARY OF THE INVENTION

A method for producing an interferogram of an infrared translucent layer that is on a reflective substrate, comprising generating parallel infrared interferometer beams by means of an infrared interferometer, converging the parallel infrared interferometer beams into converging infrared interferometer beams, sending the converging infrared interferometer beams onto the infrared translucent layer to produce diffusely reflected infrared interferometer rays from above and below the infrared translucent layer, and making the diffusely reflected infrared interferometer rays into parallel reflected infrared interferometer rays.

DESCRIPTION OF THE PREFERRED EMBODIMENT

Figure 1:
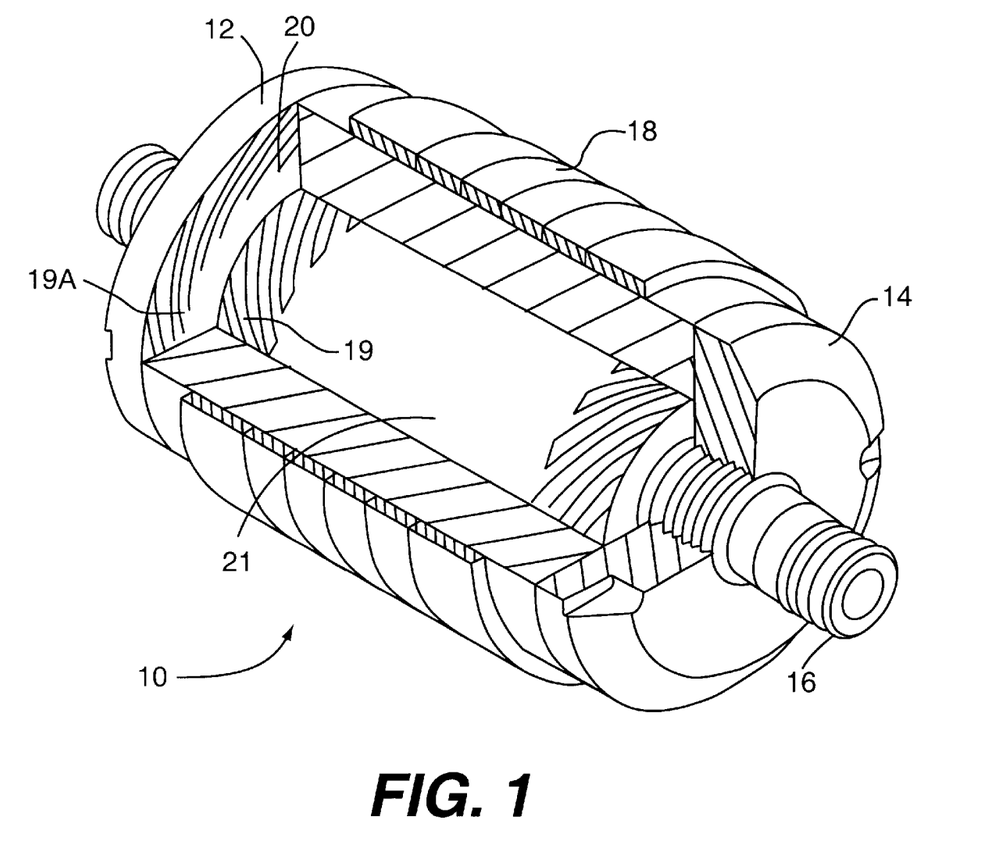
FIG. 1 is a perspective view of a gas bearing gyro rotor assembly.

An anodized gas bearing gyro rotor assembly 10 is shown in FIG. 1. The assembly 10 has two beryllium thrust plates 12 and 14, a beryllium shaft 16, and a rotor 18, as shown in FIG. 1. The plates, shaft and rotor have tight dimensional requirements, the dimensional requirements being on the order of several microinches. A microinch is symbolized by the letter u. Grooves 19 formed in the shaft 16 and grooves 19A formed in plates 12 and 14, allow a gas to pass between the shaft 16 and the rotor 18 and to thereby support rotor 18 away from shaft 16. The beryllium plates 12 and 14, and the beryllium shaft 16 are composed chiefly of beryllium metal.

Figure 6:
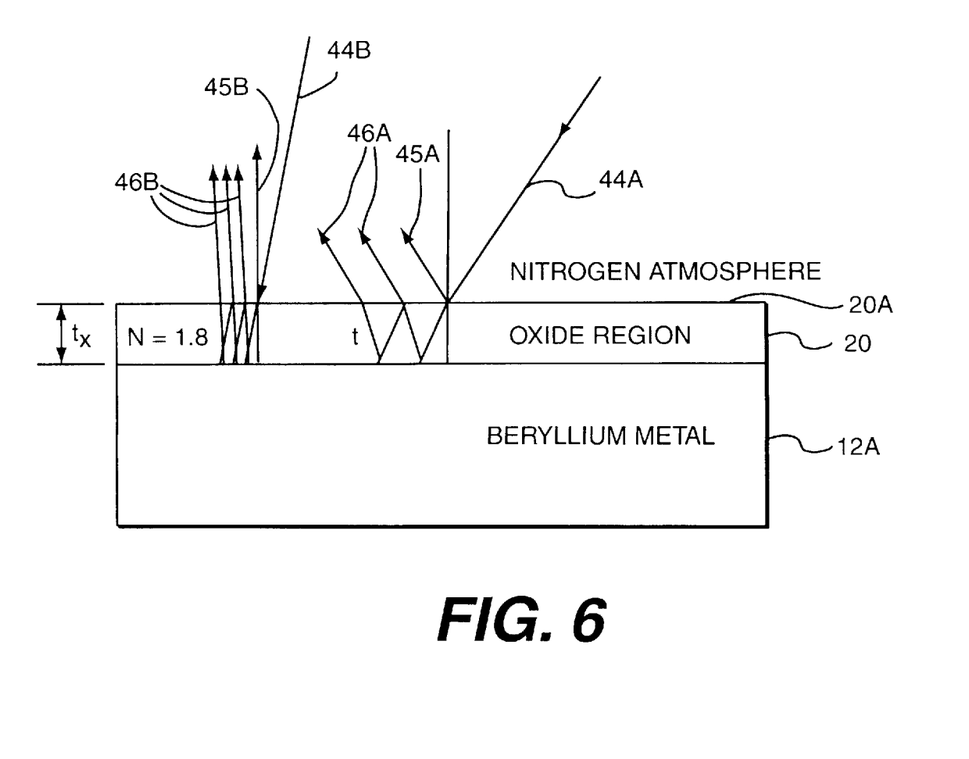
FIG. 6 is an optical ray diagram of converging interferometer beams that are impinging onto an anodized beryllium metal substrate.

The beryllium plates 12 and 14 and beryllium shaft 16 undergo a surface oxidation conversion reaction to yield topical beryllium oxide regions in the beryllium metal. A topical beryllium oxide region 20 is formed in plate 12. Beryllium oxide region 20 is over beryllium metal 12A of plate 12, as shown in FIG. 6. The thickness of the beryllium oxide region is unknown when formed. However to explain the present method, an interferogram 50 of FIG. 7 for a 25 microinch thick beryllium oxide region 20 is used. The beryllium oxide region 20 is an infrared translucent layer. The beryllium metal 12A is a reflective substrate. A beryllium oxide region(not shown) is formed in beryllium plate 14. A beryllium oxide region 21 is formed in beryllium shaft 16.

The beryllium oxide regions are thin enough to allow infrared light to pass there through. Infrared light is reflected by the beryllium metal that is beneath the beryllium oxide regions.

The beryllium oxide regions are fabricated with the intent that the depth of each of the beryllium oxide regions be approximately 65 microinches (u").

Nondestructive type testing, by the present method and apparatus, of the thicknesses of the beryllium oxide regions of the gas gyro assembly 10, is desirable. For, the gas gyro assembly 10 is one of the most critical and costly components of a pendulous integrating gyro accelerometer.

Nondestructive measurements of the thicknesses of the beryllium oxide regions are performed by the present diffuse reflectance Fourier transform infrared spectroscopy (DRFTIS) method and apparatus. The principle behind such nondestructive measuements is based on the wave nature of light. DRFTIS makes use of the surface reflectance properties of the underlying beryllium, the reflectance properties of the beryllium oxide region, and the refractive index value of a beryllium oxide region.

Figure 2:
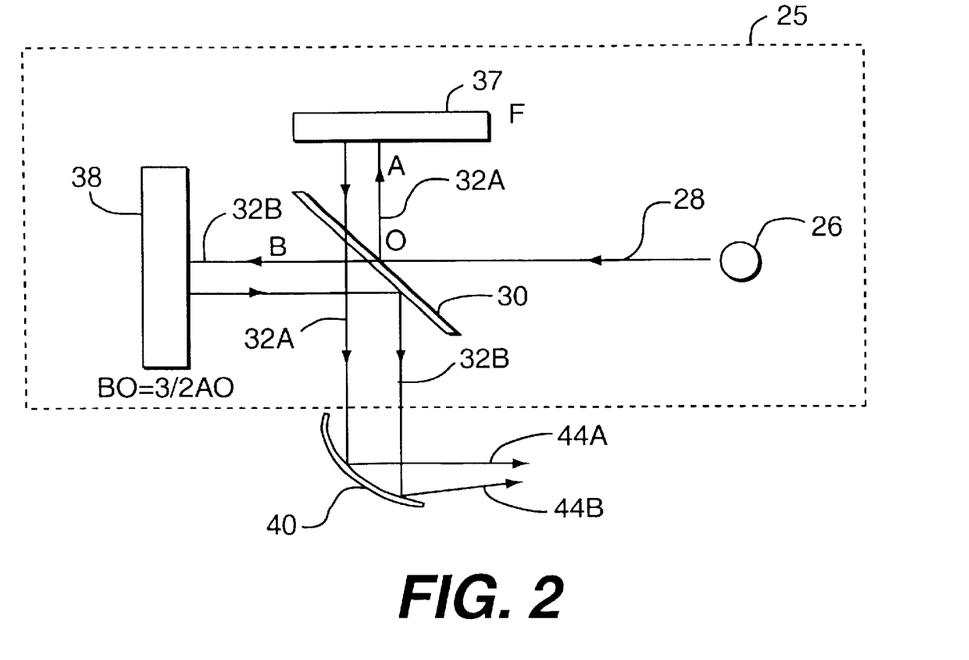
FIG. 2 is optical ray diagram of an interferometer, with a moving mirror of the interferometer having a first position to provide destructively interfering beams.
Figure 3:
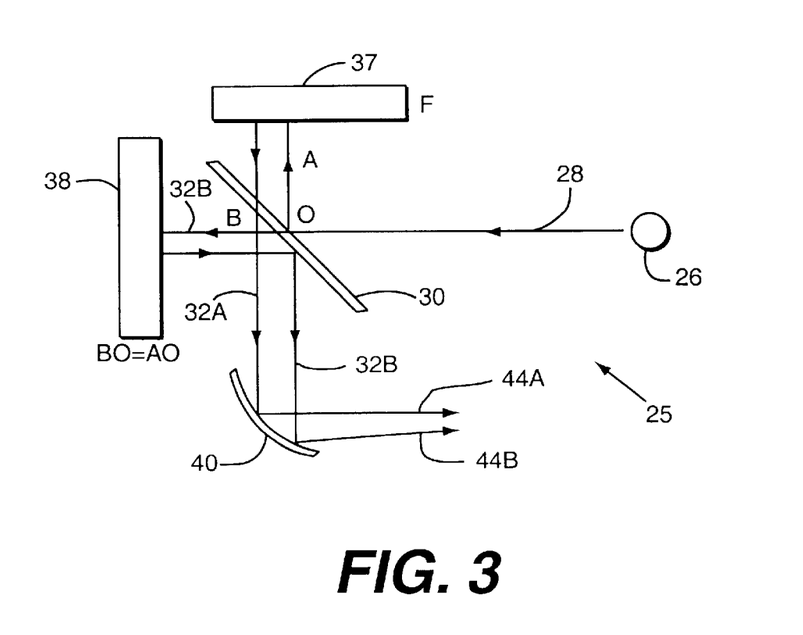
FIG. 3 is optical ray diagram of an interferometer, with a moving mirror of the interferometer having a second position to provide constructively interfering beams.
Figure 4:
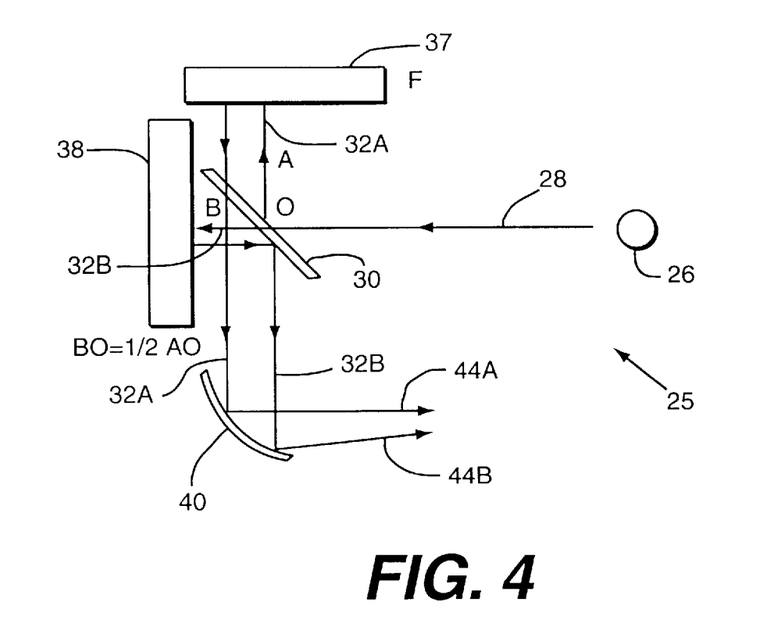
FIG. 4 is optical ray diagram of an interferometer, with a moving mirror of the interferometer having a third position to provide destructively interfering beams.

In FIGS. 2, 3 and 4 a generic layout of optics for a Michelson infrared interferometer 25, plus a concave converging mirror 40, are shown. An infrared light source 26 sends a beam 28 of infrared light toward a beam splitter 30. The beam splitter 30 splits beam 28 into infrared interferomter beams 32A and 32B. The infrared interferometer beam 32A is reflected by fixed mirror 37 and passes through beam splitter 30 toward concave mirror 40. The infrared interferometer beam 32B is reflected by movable mirror 38 and is reflected by beam splitter 30 toward concave mirror 40. Infrared interferometer beams 32A and 32B are parallel before reaching mirror 40.

The paths of the parallel infrared interferometer beams 32A and 32B are toward concave mirror 40. The concave mirror 40 reflects infrared interferometer beam 32A, to produce infrared interferometer beam 44A. The concave mirror 40 reflects infrared interferomter beam 32B, to produce infrared interferometer beam 44B. The concave mirror 40 causes infrared interferometer beams 44A and 44B to converge toward each other.

Interferometer 25 has a fixed, that is stationary, mirror 37. Interferometer 25 has a movable mirror 38. The mirror 38 is continuously moved, that is scanned, as shown by FIGS. 2, 3 and 4, to produce an interferogram of a beryllium oxide region, as further described below.

FIGS. 2, 3 and 4 respectively show infrared interferometer configurations for destructive interference, for constructive interference and for destructive interference. The movable mirror 38 is scanned from the configuration of FIG. 2 to the configuration of FIG. 4 to produce an interferogram.

Figure 5:
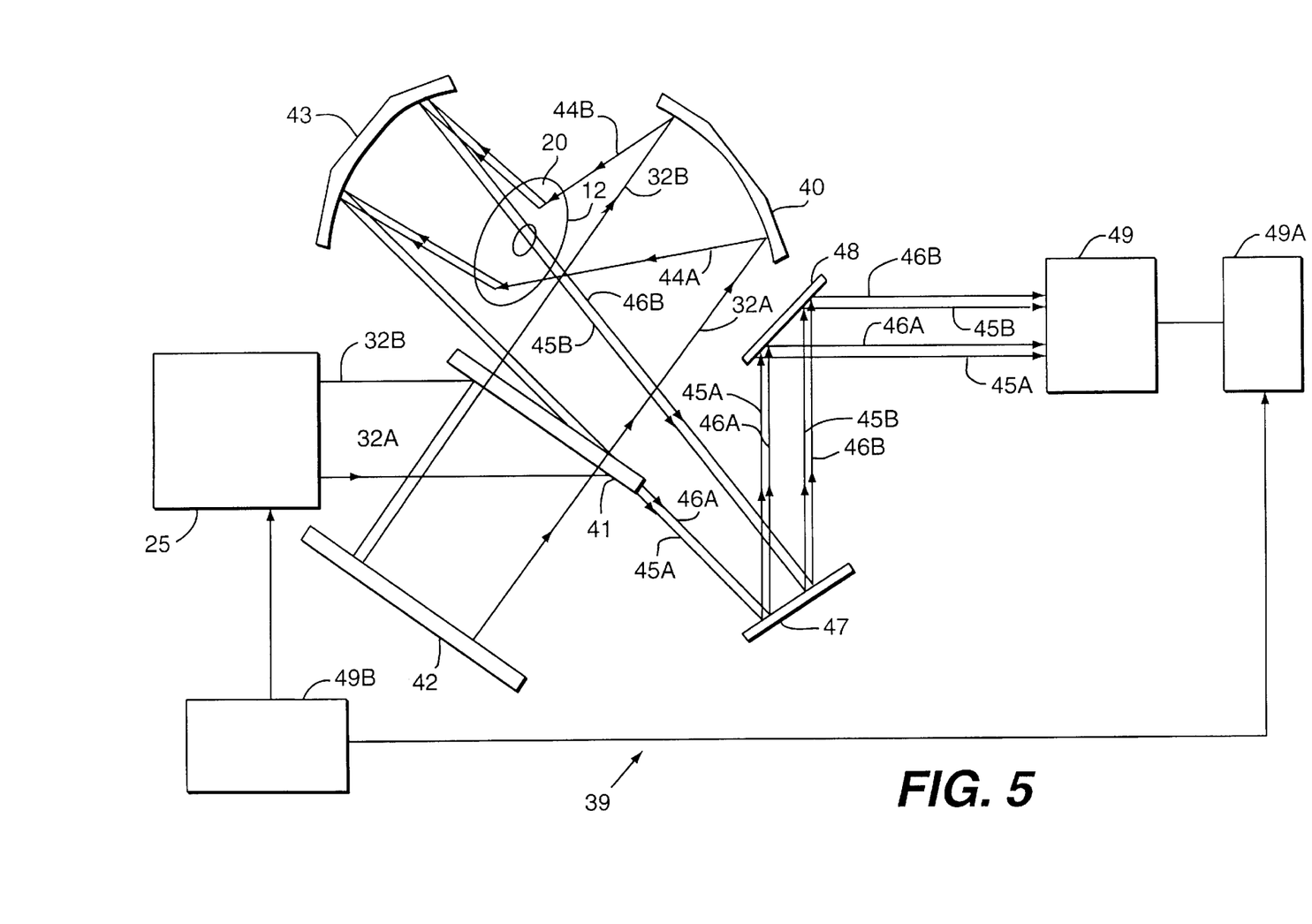
FIG. 5 is an optical ray diagram of a diffuse reflectance Fourier transform infrared spectrometer that is being used to determine the thickness of a beryllium oxide region in a beryllium plate.

A diffuse reflectance Fourier transform infrared spectroscopic apparatus 39 is shown in FIG. 5. The apparatus 39 includes a beryllium thrust plate 12 that has a beryllium oxide region 20. The apparatus 39 could alternately be made to include an alternate component, such as beryllium shaft 16 that has a beryllium oxide region 21, in place of beryllium thrust plate 12.

In FIG. 5, parallel infrared interferometer beams 32A and 32B, that are emitted by th interferometer 25, are directed by flat mirror 41 and flat mirror 42 toward concave mirror 40. Concave mirror 40 reflects the parallel infrared beams 32A and 32B, coming from the interferometer 25, and produces converging infrared interferometer beams 44A and 44B. Infrared interferomter beams 32A and 32B converge toward each other due to reflection of the beams 32A and 32B by concave mirror 40.

The converging infrared interferometer beams 44A and 44B, coming from the concave mirror 40, are sent onto thrust plate 12. The thrust plate 12 reflects infrared interferometer beam 44A to produce diffuse reflected infrared interferomter rays 45A and 46A. The thrust plate 12 reflects infrared interferometer beam 44B to produce diffuse reflected infrared interferometer rays 45B and 46B.

A concave collecting mirror 43 collects and collimates, that is makes parallel, the diffuse reflected infrared rays 45A, 46A, 45B and 46B. Diffuse reflected infrared rays 45A, 46A, 45B and 46B are collected and collimated, as shown in FIG. 5. Again, a concave collecting mirror 43 collects and makes parallel the diffuse reflected infrared rays 45A, 46A, 45B and 46B.

The parallel infrared rays 45A, 46A, 45B and 46B are reflected by flat mirror 47. The parallel rays 45A, 46A, 45B and 46B are then reflected by flat mirror 48 into a detector 49.

A varying signal is generated by detector 49, as movable mirror 38 of interferometer 25 of FIG. 5 is scanned from the position shown in FIG. 2 to the position shown in FIG. 4. The strength of the signal from detector 49 is dependent on the amount of energy in the detected interfering infrared rays 45A, 46A, 45B and 46B, as movable mirror 38 is scanned. That is, the strength of the signal is proportional to the overall strength of the reflected interfering infrared rays 45A, 46A, 45B and 46B.

Figure 7:
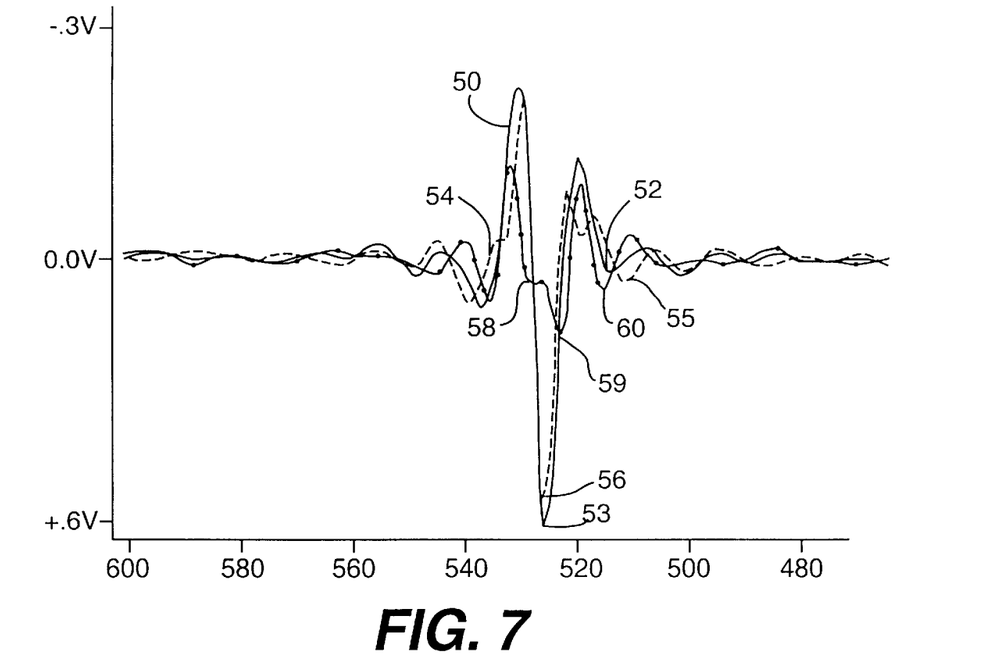
FIG. 7 is an interferogram 50 of a beryllium oxide region whose thickness is to be determined, a reference interferogram 54 and a subtracted interferogram 58. Interferogram 50 is examined to identify its centerburst and first sideburst by means of reference interferogram 54. Subtracted interferogram 58 is made by subtracting the value of reference interferogram 54 from the value of interferogram 50.

The signal is sent from detector 49 to a recorder 49A and recorder produced a trace proportional in height to the strength of the signal. A controller 49B coordinates the scanning of mirror 38 with the position of a trace in recorder 49a. The trace is interferogram 50, as shown in FIG. 7.

As shown in FIG. 6, the converging beam 44A produces rays 45A and 46A. Converging beam 44B produces rays 45B and 46B. Rays 45A and 45B are produced, respectively, as a result of beams 44A and 44B being reflected from the top of beryllium oxide region 20. Rays 46A and 46B are produced, respectively, as a result of beams 44A and 44B being reflected one or more times from beryllium metal 12A that is under the oxide region 20.

Rays 45A and 46A are parts of beam 44A. Rays 45B and 46B are parts of beam 44B. The collected rays 45A, 46A, 45B and 46B are together detected by detector 49.

The collected rays 45A, 45B, 46A and 46B are all collected by detector 49. An interferogram 50, shown in FIG. 7, is produced due to their interference at the oxide region 20 and underlying beryllium 12A, as mirror 38 of interferometer 25 is scanned inward toward the beamsplitter of interferometer 25. The movable mirror 38 of the interferometer 25 is scanned to produce a set of intensities in detector 49. This set of intensities is interferogram 50.

The intensity produced by the interference of rays 45A, 45B, 46A and 46B is essentially zero when the moving mirror 38 is at the three halves point, in distance, to the beamsplitter 30, with respect to the distance of beamsplitter 30 to mirror 37. This arrangement is shown in FIG. 2. At the three halves mark, the IR rays 45A and 46A are a half cycle out of phase with respect to IR rays 45B and 46B, thereby leading to total destructive interference (minimum energy throughput). This interference produces the left end of interferogram 50 of FIG. 7.

The rays 45A, 46A, 45B and 46B interfere to produce a maximum intensity in detector 49, known as a centerburst 53, when the mirrors 37 and 38 of interferometer 25 are equidistant from the beamsplitter 39, as shown in FIG. 3. This interference produces the center burst 53 of interferogram 50 of FIG. 7.

The intensity produced by the interference of rays 45A, 45B, 46A and 46B diminishes to zero as the moving mirror 38 approaches the halfway point, in distance, to the beamsplitter 39, with respect to the distance of beamsplitter 39 to mirror 37 as shown in FIG. 4. At the halfway mark between the moving mirror 38 and the beamsplitter 39, the IR rays 45A and 46A are again a half cycle out of synchronization with rays 45B and 46B, thereby leading to total destructive interference (minimum energy throughput). This interference produces the right end of the interferogram 50 of FIG. 7.

Diffuse reflectance Fourier transform infrared spectrometry is generally discussed. However there is no teaching or suggestion of transmission of diffuse infrared beams through a translucent oxide region, nor of a subsequent formation of a high-information interferogram, nor of a subsequent determination of a thickness of the translucent oxide layer. Such a discussion is at pages 194 to 202 of a book entitled "Fourier Transform Infrared Spectrometry" by Peter R. Griffiths and James A. de Haseth. Principals of interferometry are discussed in that book. That book was published by John Wiley & Sons, New York, in 1986. The teaching of that book are incorporated herein by reference.

In the past, when the beryllium oxide region 20 undergoes analysis by a split IR beam, in a nondiffuse reflectance mode, information imputted into an interferogram is restricted to information of the topical features, i. e. the top, of beryllium oxide region 20.

However, as herein disclosed, when the beryllium oxide region 20 undergoes analysis, by scanning movable mirror of interferometer 25, in a diffuse reflectance mode, shown in FIG. 5, a more detailed interferogram 50 is produced. This interferogram 50 has more information in it, that is information of the thickness of very thin beryllium oxide region 20 of FIGS. 1 and 6.

In FIG. 6 the angles of incidence of each of converging beams 44A and 44B are shown. In FIG. 6, such light incidence angles are shown as forty-five degrees and twenty degrees, respectively. The angle of reflection of rays 45A, and 46A has a value dependent on the angle of incidence of beam 44A. The angle of reflection of rays 45B, and 46B has a value dependent on the angle of incidence of beam 44B. In FIG. 6 such angles of reflection are shown as approximately forty-five degrees and twenty degrees, respectively. Angles of incidence, from ten degrees to eighty degrees, can be used for the disclosed diffuse reflectance Fourier transform infrared spectroscopic method and apparatus.

Although converging beams 44A and 44B are shown as being sent onto the oxide region 20 in the apparatus of FIG. 6, nonparallel diverging beams could be sent onto the oxide region 20, by means of a convex mirror in place of concave mirrir 40. Diffuse reflected rays produced by the nonparallel diverging beams would also be diverging. These latter diffuse reflected rays could be made to be parallel, by means of a concave mirror, in a similar manner that concave mirror 43 of FIG. 6 collects diffuse reflected rays 45A, 46A, 45B and 46B and makes them parallel.

Figure 9A:
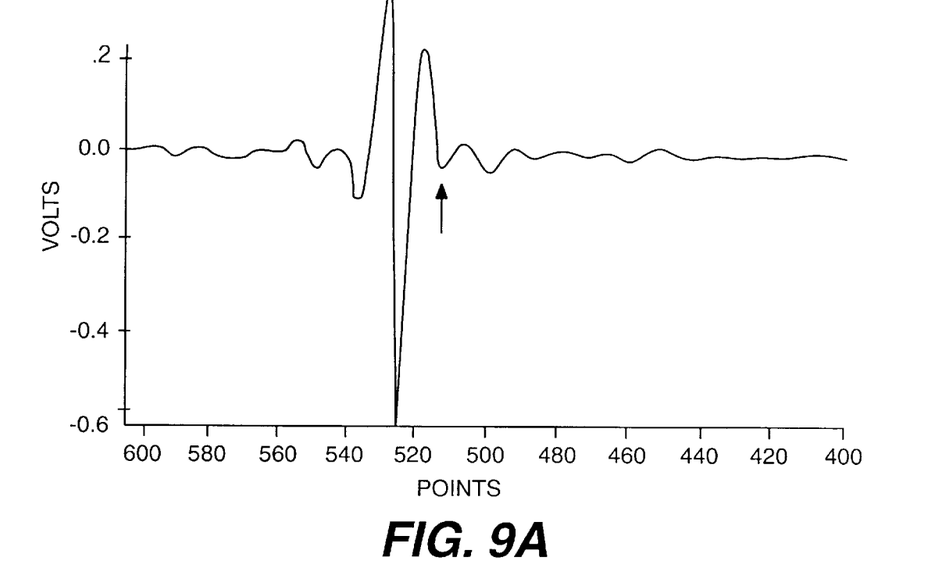
FIG. 9A is an interferogram made by measuring intensity of a diffusively reflected interferometer beam coming from a 25 microinch thick beryllium oxide region, as a moving mirror of an interferometer, that produces the interferometer beam, is scanned from a position shown in FIG. 2 to a position shown in FIG. 4. The interferogram of FIG. 9 is as interferogram 50 of FIG. 7.
Figure 9B:
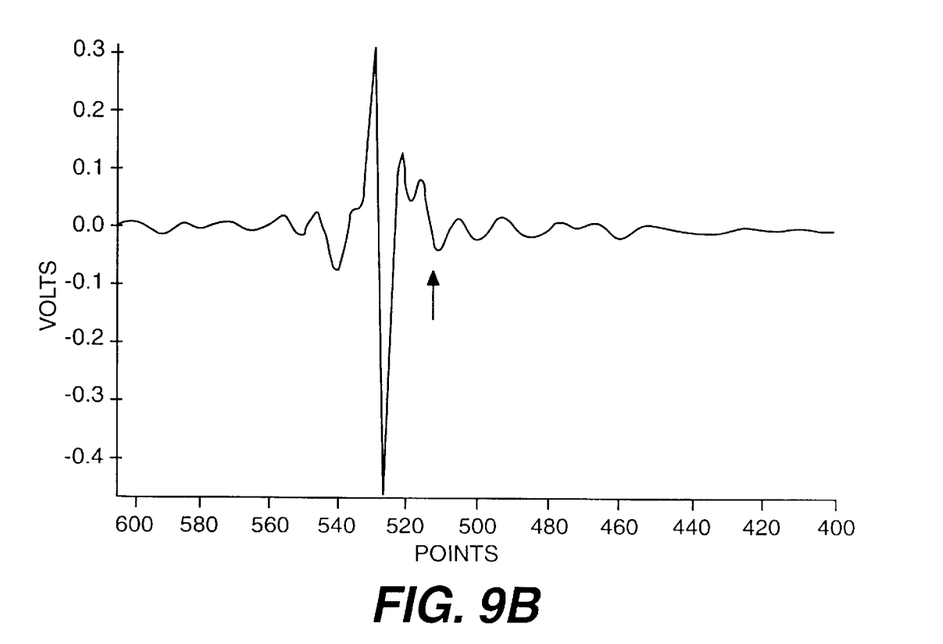
FIG. 9B is an interferogram made by measuring intensity of a diffusively reflected interferometer beam coming from a 50 microinch thick beryllium oxide region, as a moving mirror of an interferometer, that produces the interferometer beam, is scanned from a position shown in FIG. 2 to a position shown in FIG. 4.
Figure 9C:
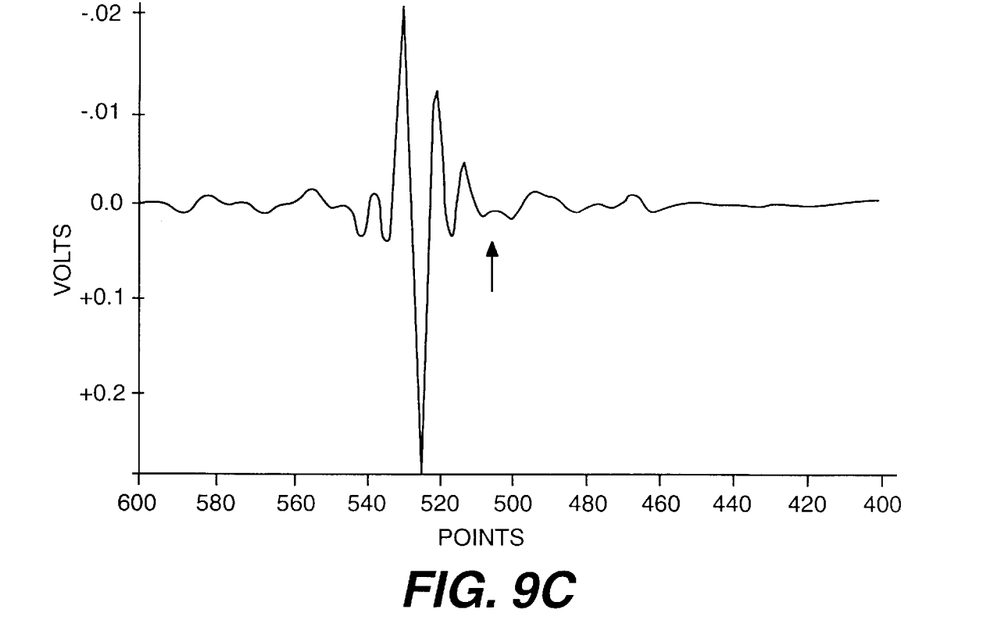
FIG. 9C is an interferogram made by measuring intensity of a diffusively reflected interferometer beam coming from a 75 microinch thick beryllium oxide region, as a moving mirror of an interferometer, that produces the interferometer beam, is scanned from a position shown in FIG. 2 to a position shown in FIG. 4.
Figure 9D:
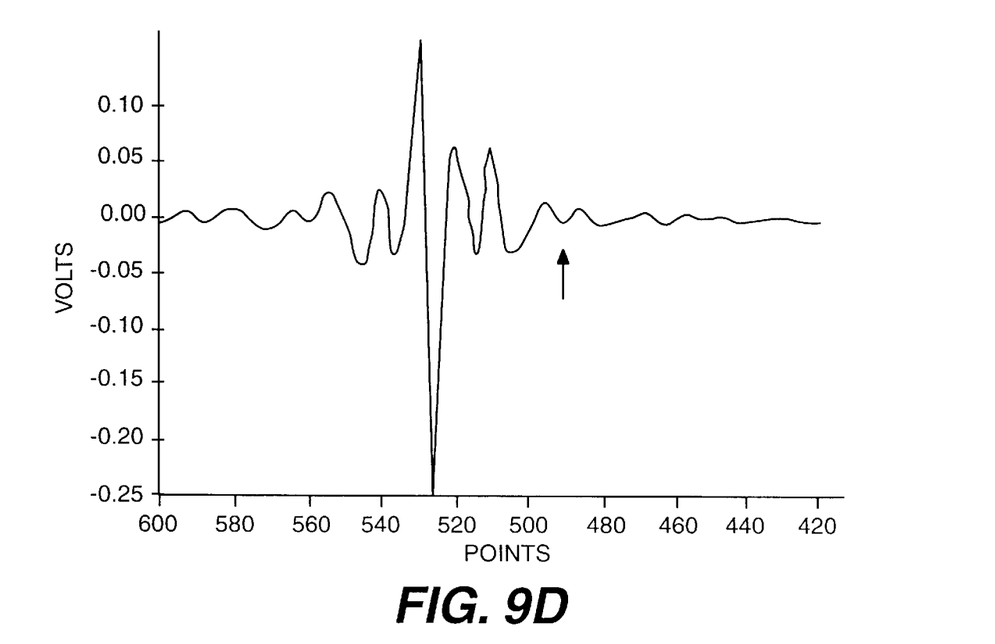
FIG. 9D is an interferogram made by measuring intensity of a diffusively reflected interferometer beam coming from a 100 microinch thick beryllium oxide region, as a moving mirror of an interferometer, that produces the interferometer beam, is scanned from a position shown in FIG. 2 to a position shown in FIG. 4.
Figure 9E:
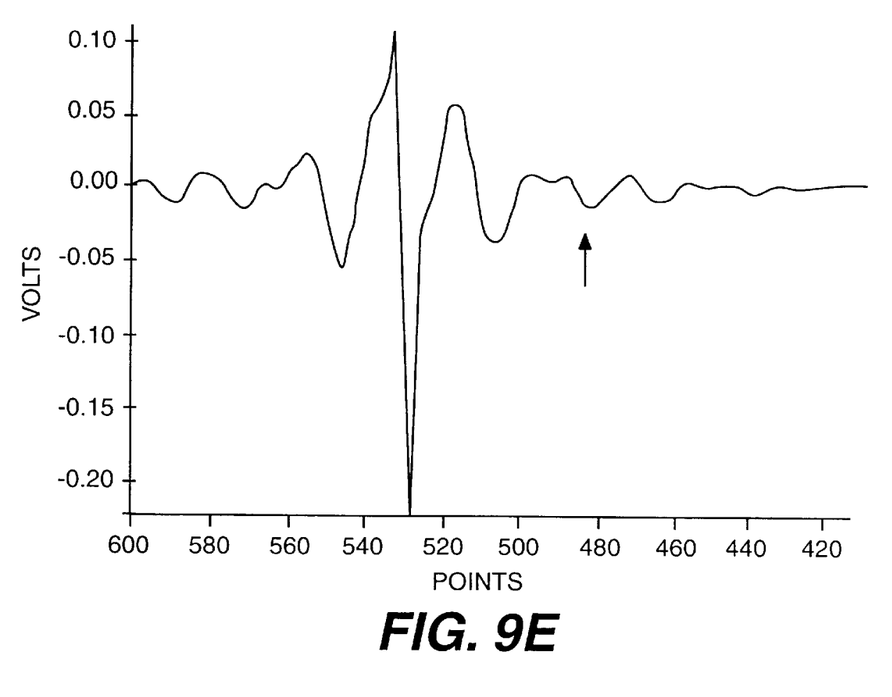
FIG. 9E is an interferogram made by measuring intensity of a diffusively reflected interferometer beam coming from a 400 microinch thick beryllium oxide region, as a moving mirror of an interferometer, that produces the interferometer beam, is scanned from a position shown in FIG. 2 to a position shown in FIG. 4.

Again, an interferogram 50, that has information of the thickness of beryllium oxide region 20, is shown in FIG. 7. The interferogram 50 is a result of IR beams 44A and 45A having very different angles of incidence, as they pass into and through the beryllium oxide region 20 and are reflected from the beryllium metal 12A. The interferogram 50 of FIG. 7 is the same as the interferogram of FIG. 9A.

A first sideburst 52 of the interferogram 50 is produced as a result of interference of rays 46A and 46B. The first sideburst 52 has information of the thickness of region 20, when first sideburst 52 is taken with centerburst 53. The first sideburst 52 is shown in FIG. 7.

In FIG. 7, the first sideburst 52 of interferogram 50 is displaced from the centerburst 53 of interferogram 50 by 10 points. 10 points is proportional to the thickness and average refractive index of the beryllium oxide region 20 of FIG. 6. This point difference is used to determine the thickness of region 20. The first sideburst 52 of FIG. 7 is due to interference between the IR rays 46A and 46B that are reflected from the beryllium metal subsurface 12A.

In the initial step of the disclosed thickness measurement technique, reference interferograms of various thicknesses of beryllium oxide, from 25 to 160 microinch thick regions, are used to identify first sideburst 52. These reference interferograms are used as references against which the interferogram 50 is compared. Interferogram 50 of region 20 is compared against such reference interferograms until a near match is found. The matching technique is described below, to identify first sideburst 52.

A beryllium oxide region that is somewhat thicker that region 20, such as a 150 microinch thick region, would increase the distance traveled by the IR beams 44A and 44B through such a thicker region.

A reference interferogram 54, shown in FIG. 7, is produced using a 150 microinch thick beryllium oxide region. A sideburst 55 of reference interferogram 54 is shown in FIG. 7. Further a centerburst 56 of reference interferogram 54 is shown in FIG. 7.

In FIG. 7 the reference interferogram 54 of a 150 microinch thick beryllium oxide region, is used as one of the reference interferograms against which the interferogram 50 is compared to identify which arc of interferogram 50 is the first sideburst, that is sideburst 52.

FIG. 7 shows a subtracted interferogram 58. The subtracted interferogram 58 is formed by subtracting the value of the reference interferogram 54 from the value of interferogram 50, at each point along the horizontal axis of FIG. 7.

A center burst 59 and a first side burst 60 of subtracted interferogram 58 are shown in FIG. 7. In the preferred initial thickness determination step the shape of the reference interferogram 58 is used to identify first sideburst 52.

In the final step of the disclosed thickness measurement technique, the distance between first sideburst 52 and centerburst 53 is measured. The measured distance allows one to determine the exact thickness of beryllium oxide region 20.

The matching technique can be adjusted if the index of refraction of region 20 is not exactly the same as the index of refraction of the beryllium oxide regions that are used to produce the reference interferograms. An adjustment factor can be multiplied by the measured distance to find a second order thickness of region 20. The adjustment factor would be the refractive index of the regions generating the reference interferograms, divided by the refractive index of the region 20.

To prove out the interferogram mechanism for an anodic region, numerous thrust plates, and shafts, with a wide range of known oxide regions having thicknesses from 25 u" to 150 u", were prepared. Interferograms for these regions are shown in FIGS. 9A to 9E. These interferograms prove that a sideburst of an interferogram moves away from the centerburst of that interferogram, as the thickness of the region, being measured, becomes greater.

In the disclosed measurement technique, one compares an interferogram of a first order known thickness, with a set of reference interferograms of various regions having known thicknesses, in order to determine a second order known thickness. The range of known thicknesses should include the first order known thickness.

As an alternate first order measurement technique, a thickness value of a known thickness of a standard interferogram that has a sideburst-centerburst distance that is approximately the same as the sideburst-centerburst distance of the interferogram of the unknown thickness, could be taken as the first order thickness value of the unknown thickness.

Several interferograms, made from thrust plates with various thicknesses of beryllium oxide regions are shown in FIGS. 9A to 9E. Arrows designate the first sidebursts, verifying the proposed interaction of the IR beams 32A and 32B with the beryllium subsurface. While a spectroscopist would be able to determine the thickness of the anodization region of any shaft or plate by inspection of the interferometers of FIGS. 9A to 9E, an automated means of interpreting the spectra was necessary if the technique were to be useful in a production environment.

An implementation plan can be used to determine how the information generated by diffuse reflectance Fourier transform infrared spectroscopy, DRFTIR, can be applied in production. When implemented, the method will find many uses in production in addition to routine oxide thickness evaluation. For example, such uses are:

(1) Nondestructive evaluation of finishing effects and the uniformity of an anodization region; and (2) Detection of changes in the chemical composition of an anodization region based on refractive index and key absorbances in the infrared spectrum.

Straight specular Fourier transform infrared spectroscopy had previously demonstrated its usefulness in other areas of online production use such as nondestructive gas bearing lube analysis.

Diffuse reflectance Fourier transform infrared spectroscopic analysis of anodization region thickness is another step forward in providing noncontact, nondestructive tools to access important parameters that give meaningful information to the production engineer about manufacturing processes. On-Line DRFTIR implementation can be used, in production activities, for anodize thickness measurement.

The plate and shafts prepared with different coating thicknesses were tested by using diffuse reflectance Fourier transform spectroscopy and a shellscript program, as shown below. A comparison of the coating thicknesses for shafts and thrust plates, as determined by three techniques (DRFTIR, Acid-Etch and Time/Current measurements), is presented in Table 1, as follows:

TABLE 1

Comparison of Anodize Coating Thickness Values By DRFTIR, Acid-Etch and Time/Current Measurements*

| CURRENT/TIME | | DRFTIR PROGRAM | | ACID-ETCH | |
|---|---|---|---|---|---|
| Microns | u inches | Microns | u inches | Microns | u inches |
| THRUST PLATES | | | | | |
| 0.635 | 25 | 0.67 | 27 | 0.79 | 31 |
| 1.27 | 50 | 1.46 | 58 | 1.27 | 50 |
| 1.905 | 75 | 1.81 | 72 | 1.80 | 71 |
| 2.54 | 100 | 2.28 | 91 | 2.38 | 95 |
| 3.175 | 125 | 2.60 | 104 | 2.98 | 119 |
| 3.81 | 150 | 3.78 | 151 | 3.62 | 143 |
| SHAFTS | | | | | |
| 0.635 | 25 | 0.68 | 27 | 0.71 | 28 |
| 1.27 | 50 | 1.26 | 50 | 1.45 | 58 |
| 1.905 | 75 | 1.80 | 75 | 2.10 | 84 |
| 2.54 | 100 | 2.89 | 115 | 2.84 | 114 |
| 3.175 | 125 | 3.04 | 122 | 3.05 | 122 |
| 3.81 | 150 | 3.96 | 158 | 4.11 | 164 |

*Site of DRFTIR analysis may not be the same as site where acid etch occurred.

The DRFTIR results agreed reasonably with the acid/etch method, with only two samples showing a discrepancy greater than 10 microinches. The observed differences may by due mainly to the changes in the refractive index of the coating. This seems to be a function of the thickness. Hypothetically, the refractive index of the coating decreases with increasing coating thickness (n=2.1 for 25 microinches vs. n=1.8 for 150 microinches).

An accurate epilayer thickness calculation by the prior art software program was dependent on an accurate value for refractive index as well as an optimal reference thickness. The interferogram for the reference region is subtracted from the sample's interferogram as part of the prior art program, in a manner somewhat similar to that used to produce the difference interferogram 58 as shown in FIG. 7.

Because the anodization region is so thin, the reference thicknesses had to be very close to the sample thickness, for the the disclosed method to be effective. When working with such thin regions, the prior art program could not discern the position of the first sideburst 52 when using a reference sideburst that was too remote from the sample sideburst. For example, the step of using a 240 u" reference for a 75 u" oxide region was not effective in finding the first sideburst. u" refers to a microinch unit of measure.

Figure 8:
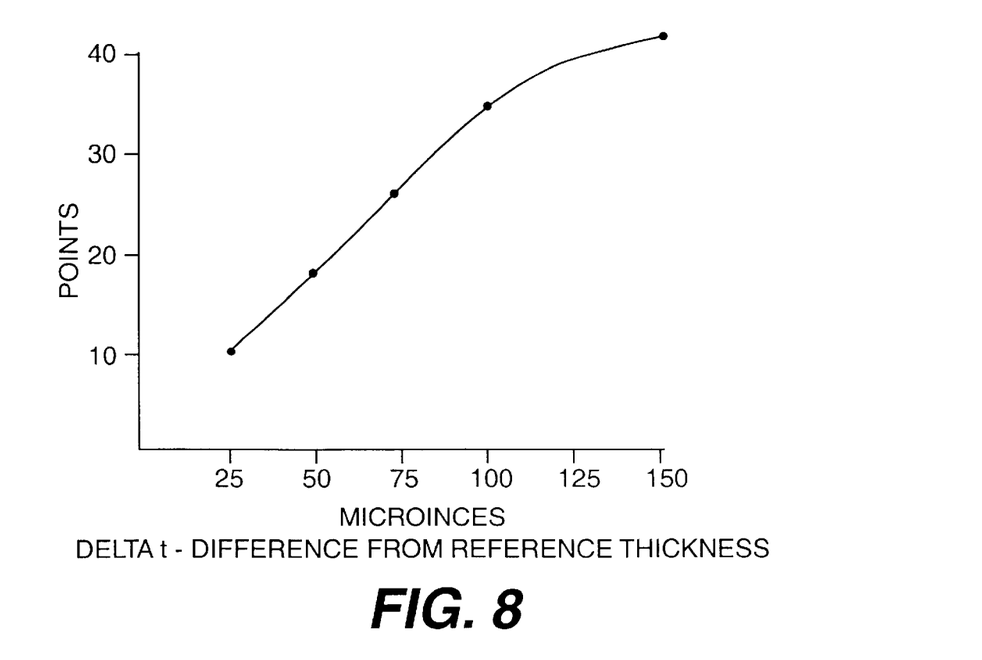
FIG. 8 is a gage that can be used to determine oxide thickness directly from an interferogram of the oxide.

In FIG. 8 a gage is shown. The gage is one example of a calibration standard to be used to determine the thickness of the infrared translucent. This gage could be used in the thickness measurement technique. This gage presents the results of the point distance between a first side burst and a center burst of each of several interferograms of FIG. 9. With this gage one can determine the thickness of a region by measuring the point distance between the center burst and the first side burst of the region's interferogram. One measures the point distance between a sideburst and a centerburst for an interferogram, and compared the point distance to the same point distance on the gage, and reads off the thickness value shown on the gage. This thickness value is taken as the thickness of the region under investigation. Again, one compares that measured distance on the gage, to find a corresponding thickness for that region, on the gage.

The values shown on the gage can be programmed into a computer, as an set of equations that provide thickness over the point range shown in FIG. 8. Then by putting the measured point distance taken from an interferogram of a region under investigation into the computer, the thickness of the region under investigation will be provided as an output, by the computer.

A shellscript calls out the appropriate reference interferograms and refractive index settings for use in a successive set of exclusion windows. In the first sideburst identity search step, the program gradually searches each window for the sideburst of interferogram 50 that is observed to be closest to the centerburst. When the first sideburst 52 is located, the program calculated the thickness of the beryllium oxide region, e.g. region 20, and reports the thickness of the beryllium oxide region.

If the operator has a general idea of the thickness of the beryllium oxide region and inputs the information into the FTIR computer when asked by the shellscript program, the computer will determine if the appropriate first sideburst for that thickness is present in the corresponding exclusion window, within two minutes. If the first sideburst is not observed, the program informs the operator that the proposed thickness is inaccurate and asks if the operator wants to proceed with the determination of the true thickness. This takes about fifteen minutes while the computer searches through each exclusion window. The program gives the operator control over the direction of analysis.

While the present invention has been disclosed in connection with the preferred embodiment thereof, it is understood that there may be other embodiments which fall within the spirit and scope of the invention as defined by the following claims.

What is claimed is:

1. A method for producing an interferogram of an infrared translucent layer that is on a reflective substrate, comprising:
    (a) generating parallel infrared interferometer beams by means of an infrared interferometer;
    (b) converging the parallel infrared interferometer beams into converging infrared interferometer beams;
    (c) sending the converging infrared interferometer beams onto the infrared translucent layer to produce diffusely reflected infrared interferometer rays from above and below the infrared translucent layer; and
    (d) making the diffusely reflected infrared interferometer rays into parallel reflected infrared interferometer rays.

2. A method for producing an interferogram of an infrared translucent layer on a reflective substrate, comprising:
    (a) generating parallel infrared interferometer beams by means of an infrared interferometer;
    (b) converging the parallel infrared interferometer beams into converging infrared interferometer beams;
    (c) sending the converging infrared interferometer beams onto the infrared translucent layer to produce diffusely reflected infrared interferometer rays from above and below the infrared translucent layer;
    (d) making the diffusely reflected infrared interferometer rays into parallel reflected infrared interferometer rays;
    (e) detecting the strengths of the parallel reflected infrared interferometer rays; and
    (f) scanning a movable mirror of the interferometer over a distance, in order to generate varying strengths of diffusely reflected infrared interferometer rays;
    (g) displaying the detected strengths as a function of an incremental amount of a scanned distance of the movable mirror, to produce an interferogram of the infrared translucent layer.

3. A method for determining a thickness of an infrared translucent layer on a reflective substrate, comprising:
    (a) generating parallel infrared interferometer beams by means of an infrared interferometer;
    (b) converging the parallel infrared interferometer beams into converging infrared interferometer beams;
    (c) sending converging infrared interferometer beams onto the infrared translucent layer to produce diffusely reflected infrared interferometer rays from above and below the infrared translucent layer;
    (d) making the diffusely reflected infrared interferometer rays into parallel reflected infrared interferometer rays;
    (e) detecting the strengths of the parallel reflected infrared interferometer rays;
    (f) scanning a movable mirror of the interferometer over a distance, in order to generate varying strengths of the diffusely reflected infrared interferometer rays;
    (g) displaying the strengths as a function of an incremental amount of a scanned distance of the movable mirror, to produce an interferogram of the infrared translucent layer;
    (h) measuring the distance between a first side burst and a centerburst of the interferogram of the infrared translucent layer; and
    (i) comparing the measured distance to a calibration standard to determine the thickness of the infrared translucent layer.

4. Apparatus for producing an interferogram of an infrared translucent layer on a reflective substrate, comprising:
    (a) infrared interferometer means for generating parallel infrared interferometer beams;
    (b) means for converging parallel infrared interferometer beams toward each other;
    (c) means for holding the infrared translucent layer within a path of the converging infrared interferometer beams to produce diffuse reflected infrared interferometer rays from above and below the infrared translucent layer; and
    (d) means for making the diffuse reflected infrared interferometer rays into parallel reflected infrared interferometer rays.

5. Apparatus for producing an interferogram of an infrared translucent layer on a reflective substrate, comprising:
    (a) infrared interferometer means for generating parallel infrared interferometer beams;
    (b) means for converging parallel infrared interferometer beams toward each other;
    (c) means for holding the infrared translucent layer within a path of the converging infrared interferometer beams to produce diffuse reflected infrared interferometer rays from above and below the infrared translucent layer;
    (d) means for making the diffuse reflected infrared interferometer rays into parallel reflected infrared interferometer rays;
    (e) means for scanning a movable mirror of the infrared interferometer in order to generate varying strengths of the diffusely reflected infrared interferometer rays;
    (f) means for detecting strengths of the varying strenghs of the parallel reflected rays; and
    (g) displaying the strengths as a function of an incremental amount of a scanned distance of the movable mirror, to produce an interferogram of the infrared translucent layer.

6. Apparatus for producing an interferogram for an infrared translucent layer on a reflective substrate, comprising:
    (a) interferometer means for producing a first parallel pair of infrared interferometer beams, the interferometer means having a movable mirror that causes the collimated pair of infrared interferometer beams to destructively or constructively interfere with each other as the movable mirror is scanned;
    (b) first reflective means, having a concave reflective surface, for reflecting and converging the parallel pair of infrared interferometer beams toward the infrared translucent layer on the reflective substrate, diffuse reflected infrared rays being reflected from above and below the infrared translucent layer;
    (c) second reflective means, having a concave reflective surface for collimating the diffuse reflected infrared rays into collimated infrared rays;
    (d) means for sending the collimated infrared rays toward a detector means;
    (e) means for detecting changing amounts of energy in the collimated infrared rays, as the movable mirror is being scanned, and for producing a signal proportional to the changing amounts of energy in the collimated infrared rays; and
    (f) means for recording the signal as a function of distance that the movable mirror is scanned, to produce an interferogram for the infrared translucent layer.

* * * * *